United States Patent [19]

Fabre

[11] Patent Number: 5,367,460
[45] Date of Patent: Nov. 22, 1994

[54] METHOD OF SIGNALLING INSUFFICIENT MANEUVERABILITY OF AN AIRCRAFT AND DEVICE IMPLEMENTING SUCH A METHOD

[75] Inventor: Pierre Fabre, Toulouse, France

[73] Assignee: Societe Nationale Industrielle et Aerospatiale, Paris, France

[21] Appl. No.: 898,084

[22] Filed: Jun. 12, 1992

[30] Foreign Application Priority Data

Jun. 14, 1991 [FR] France .................. 91 07355

[51] Int. Cl.$^5$ .............................. G08B 23/00
[52] U.S. Cl. ..................... 364/424.06; 364/433; 244/181; 340/968; 340/969; 340/970; 340/963
[58] Field of Search ............. 364/424.06, 433; 340/968, 967, 966, 963, 969, 970; 244/181

[56] References Cited

U.S. PATENT DOCUMENTS

| | | | |
|---|---|---|---|
| 4,012,713 | 3/1977 | Greene et al. | 340/27 R |
| 4,079,905 | 3/1978 | Greene | 244/191 |
| 4,725,811 | 2/1988 | Muller et al. | 340/968 |
| 4,728,951 | 3/1988 | Johnson et al. | 340/968 |
| 4,855,738 | 8/1989 | Greene | 340/968 |
| 4,891,642 | 1/1990 | Muller | 340/968 |
| 5,119,091 | 6/1992 | Zweifel | 340/968 |
| 5,170,163 | 12/1992 | Collins et al. | 340/967 |
| 5,220,322 | 6/1993 | Bateman et al. | 340/970 |

FOREIGN PATENT DOCUMENTS

0297939 1/1989 European Pat. Off. .
WO89/06411 7/1989 WIPO .

OTHER PUBLICATIONS

Transactions of the Institute of Measurement and Control, vol. 8, No. 1, 1 Mar. 1986 McLean, "A novel system for in-flight detection of wind shear".

*Primary Examiner*—Thomas G. Black
*Assistant Examiner*—Julie D. Day
*Attorney, Agent, or Firm*—Marshall, O'Toole, Gerstein, Murray & Borun

[57] ABSTRACT

Method for signalling insufficient maneuverability of an aircraft according to which:

in a preparatory phase: with the aid of a plurality of N flight configurations, the weighting coefficients between three quantities G1, G2, G3 are determined, representative respectively of the acceleration, the slope angle of the trajectory and the risk of stalling, coefficients such that the weighted sum of said quantities is less than a threshold when maneuverability is insufficient;

in an in-flight utilization phase: said weighted sum is calculated and a signal signifying insufficient maneuverability is generated if said sum is less than said threshold.

Application to controlling aircraft.

15 Claims, 2 Drawing Sheets

METHOD OF SIGNALLING INSUFFICIENT MANEUVERABILITY OF AN AIRCRAFT AND DEVICE IMPLEMENTING SUCH A METHOD

BACKGROUND OF THE INVENTION

The present invention relates to a method and a device making it possible to signal insufficient maneuverability of an aircraft.

The maneuverability of an aircraft in flight is defined by its ability to rapidly regain level flight under the action of its pitch control surfaces alone. This maneuverability thus defines a safety margin permitting the aircraft to confront any necessity for change in its trajectory, and to do this with all the more ease as this safety margin is higher. One way of attempting to guarantee this margin is to maintain the speed above the stall speed, which ensures the aircraft a certain aerodynamic support in the air. However, this necessitates the pilot permanently ensuring compliance with this minimum speed, which imposes permanent or at least intermittent vigilance on him. Moreover, this speed criterion does not translate perfectly into this safety margin, or maneuverability margin, with respect to a minimum threshold, as speed is not the only quantity in play in this maneuverability margin.

SUMMARY OF THE INVENTION

The present invention aims to reduce the workload of the pilot and to supply a more precise indication of the margin for maneuver of the aircraft. It also aims to permit continuous optimization of the maneuverability margin of the aircraft.

To this end, according to the invention, the method for signalling insufficient maneuverability of an aircraft is noteworthy in that:

in a preparatory phase, with the aid of a plurality N of simulated, calculated or real flight configurations of the aircraft, a) linear relationships between a first, a second and a third quantity G1, G2 and G3 are determined, relative respectively to the vertical acceleration of said aircraft, to the slope angle of the trajectory of said aircraft with respect to the horizontal, and to the risk of stalling said aircraft, by weighting, relatively to each other, the respective instantaneous values G1$i$, G2$i$ and G3$i$, with ($i=1,2,\ldots,j,k,\ldots,N$) of these three quantities by respective coefficients A, B and C which are such that, when the maneuverability margin is estimated to be insufficient for the G1$j$, G2$j$ and G3$j$ values in question of said three quantities, the weighted sum $Dj = A \cdot G1j + B \cdot G2j + C \cdot G3j$ is less than every other weighted sum $Dk = A \cdot G1k + B \cdot G2k + C \cdot G3k$ for which the maneuverability margin is estimated to be sufficient for values G1$k$, G2$k$ and G3$k$ of said quantities G1, G2 and G3;

b) a value DO of insufficient maneuverability threshold SIM is chosen, greater than every value of a weighted sum Dj for which the maneuverability margin is insufficient, and less than every value Dk for which the maneuverability margin is sufficient;

then, in an in-flight utilization phase:

c) the instantaneous values of said first, second and third quantities G1, G2, G3 are simultaneously measured and the sum of said first, second and third quantities G1, G2, G3 are calculated, weighted respectively by the weighting coefficients A, B and C; and d) said sum is compared to said value DO of insufficient maneuverability threshold SIM and an insufficient maneuverability signal IM is generated if said sum is less than said value DO of insufficient maneuverability threshold SIM.

It is also possible, after having effected, in a preliminary phase, measurements of said quantities in various in-flight configurations, to determine, by means of a simple calculation using a limited number of quantities which are taken independently of each other, whether the maneuverability margin is sufficient or not, and to generate an insufficient maneuverability signal if necessary. This signal, available to the pilot, may be representative of the quantified maneuverability margin or may be an "all-or-nothing" signal indicating insufficient maneuverability.

Said third quantity G3 may represent the speed of the aircraft with respect to the ground. This quantity is already available on board the aircraft, which thus needs no additional indicator. This third quantity G3 may, in a variant, represent the incidence angle $\alpha$ of the aircraft.

This quantity is also available on board the aircraft.

Moreover, so as to optimize the sensitivity of the weighted sum of said quantities with respect to these quantities, the method according to the invention makes it possible to offset the zero of certain of said first, second and third quantities G1, G2, G3.

It is thus possible to get clear of the zero reference of the corresponding indicator, and refine the determination of the weighting coefficients by optimizing the sensitivity of the weighted sum of said quantities with respect to these quantities.

It is also possible, with a view to limiting excessive influence by one or more quantities, to clip the peaks of some of said first, second and third quantities G1, G2 and G3 on at least one side of their range of variation.

This makes it possible to eliminate the preponderant influence of one of these quantities which would have a high value, and which would mask an insufficient value of the other quantities.

Moreover, the method according to the invention makes it possible to have an insufficient maneuverability signal IM which contains an item of information indicating the amplitude of said insufficient maneuverability.

Hence the pilot can know the amplitude of the deviation with respect to said insufficient maneuverability threshold SIM, and can thus know the sense of variation of this deviation, which makes it possible to judge the effectiveness of a maneuver tending to reestablish the safety margin.

This method of signalling insufficient maneuverability of an aircraft may be applied to the slaving of a flight control device of an aircraft, said insufficient maneuverability signal IM being used by said flight control device.

This flight control device is thus informed of the value of the deviation with respect to the insufficient maneuverability threshold, and it can react as a consequence, all the more so as it perceives the sense and the speed of variation of said insufficient maneuverability signal.

In particular, said flight control device can act essentially on those of said quantities whose value clearly deviates from a particular predetermined limit value.

This thus permits correction, firstly, of the values of the quantities which deviate greatly from a normal value.

Moreover, said flight control device can act on said quantities in order to optimize the maneuverability margin.

This makes it possible, permanently, to maintain an optimum maneuverability margin.

In order to implement said method, a device for signalling insufficient maneuverability of an aircraft, comprising a first indicator able to supply a first quantity G1 relating to the vertical acceleration of said aircraft, a second indicator able to supply a second quantity G2 relating to the slope angle of the trajectory of said aircraft with respect to the horizontal, and a third indicator able to supply a third quantity G3 relating to the risk of stalling said aircraft, is noteworthy in that it comprises:

- a first, a second and a third multiplier, receiving respectively said first, second and third quantities G1, G2, G3, able to multiply respectively said quantity received by a first, a second and a third predetermined coefficient, and able to supply, respectively, a first, a second and a third result;
- an algebraic adder, receiving respectively, on three inputs, said first, second and third results and able to supply a sumcorresponding to the summing of the values applied at said three inputs;
- a comparator receiving, on a first input, said sum, and, on a second input, a predetermined value DO of insufficient maneuverability threshold SIM, and able to supply, at its output, an insufficient maneuverability signal IM if said sum differs from said predetermined value (DO) of insufficient maneuverability threshold (SIM), in a sense such that, when the speed of said aircraft with respect to the ground decreases, the value of said sum diverges from said value (DO) of insufficient maneuverability threshold (SIM).

Said method is thus implemented very simply without the need for long or complex calculations.

Similarly, said method may be implemented by a device for signalling insufficient maneuverability of an aircraft, comprising a first indicator able to supply a first quantity G1 relating to the vertical acceleration of said aircraft, a second indicator able to supply a second quantity G2 relating to the slope angle of the trajectory of said aircraft with respect to the horizontal, and a third indicator able to supply a third quantity G3 relating to the risk of stalling said aircraft, is noteworthy in that it comprises:

- a first and a second multiplier, respectively receiving one among said first, second and third quantities G1, G2, G3, able to multiply respectively said quantity received by a first and a second predetermined coefficient, and able to supply, respectively, a first result and a second result;
- an algebraic adder, receiving respectively, on three inputs, said first and second results and that one, among said first, second and third quantities Gi, G2, G3 that said first and second multipliers do not receive, and able to supply a sum corresponding to the summing of the values applied at said inputs;
- a comparator receiving, on a first input, said sum, and, on a second input, a predetermined value of insufficient maneuverability threshold SIM, and able to supply, at its output, an insufficient maneuverability signal IM if said sum differs from said predetermined value of insufficient maneuverability threshold SIM, in a sense such that, when the speed of said aircraft with respect to the ground decreases, the value of said sum diverges from said value of insufficient maneuverability threshold SIM.

Hence such a device makes it possible to implement said method, in a very simple embodiment, capable of using pre-existing calculation circuits.

Moreover, said devices for signalling insufficient maneuverability of an aircraft may comprise at least one peak clipper able to limit the range of variation of one of said first, second or third quantities G1, G2, G3.

This avoids taking into account too high a value which would mask insufficient values of the other quantities.

Similarly, said devices for signalling insufficient maneuverability of an aircraft may comprise at least one offset circuit able to offset the reference of the zero of one of said first, second or third quantities G1, G2, G3.

Hence it is possible to get free of the position of the zero linked to the indicators, and also to optimize the influence of each of said values in the weighted slim.

The figures of the attached drawing will make it easy to understand how the invention may be embodied. In these figures, identical references designate similar elements.

Figure 1:
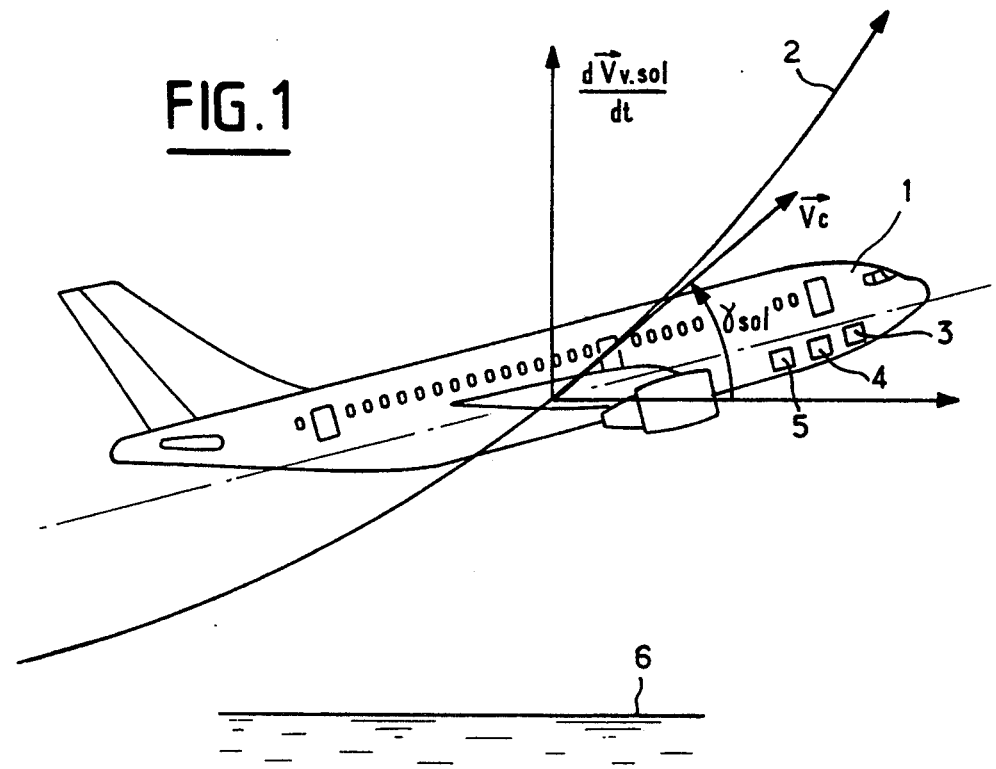
FIG. 1 represents an aircraft in flight, comprising indicators supplying quantities characterizing its maneuverability.

An aircraft 1 in flight follows a certain trajectory 2, as represented in FIG. 1, and comprises a first indicator 3 able to supply a first quantity G1 which is the vertical component $d\vec{v}.sol/dt$ of the vector representing the acceleration experienced by the aircraft 1, while a second indicator 4 measures a second quantity G2 which is the slope angle $\gamma sol$ of said trajectory 2 with respect to the horizontal, and while a third indicator 5 measures a third quantity G3 signifying the risk of stalling, that is to say the speed of the aircraft I with respect to the ground 6 or the incidence angle $\alpha$ of the aircraft 1. The speed is represented by a vector $\vec{v}c$ tangent to the trajectory 2 and, by convention, the values corresponding to the vectors oriented upwards have a positive sign.

Figure 2:
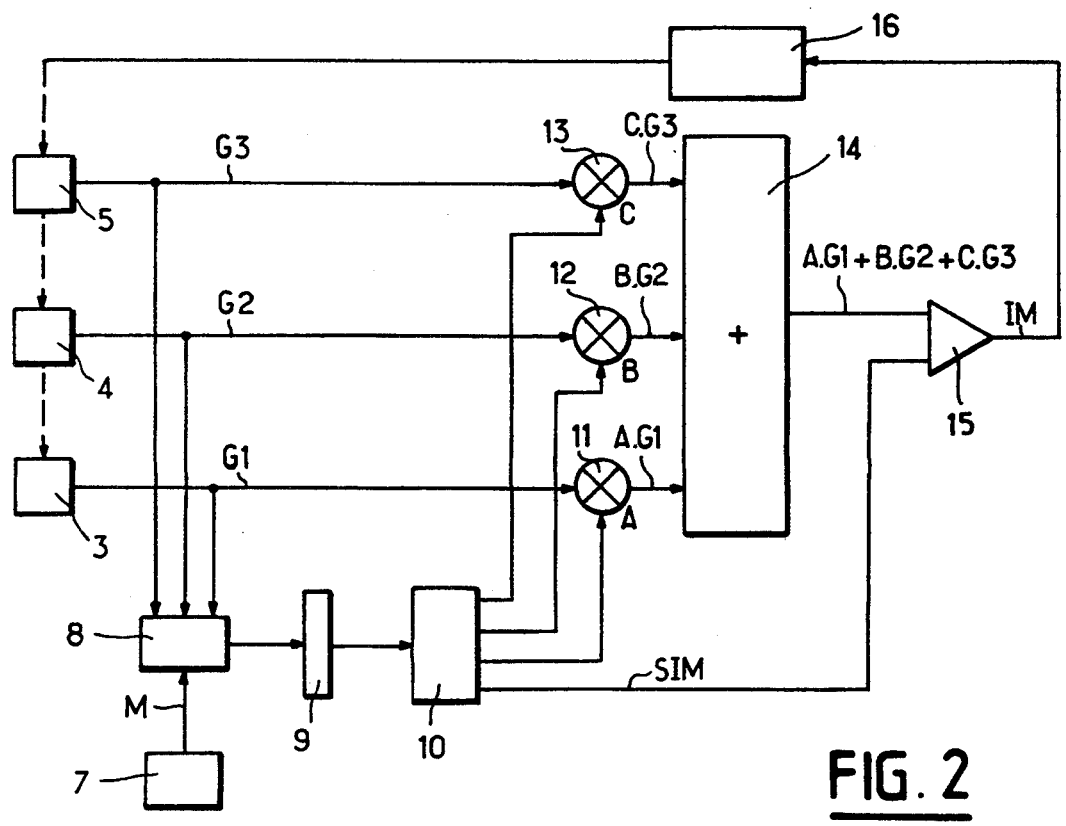
FIG. 2 is a diagrammatic representation of the circuits making it possible to implement, according to the invention, the method of processing the quantities supplied by said indicators, in order to supply an insufficient maneuverability signal.

The maneuverability margin M is reduced when this aircraft 1 has low kinetic energy, that is to say when its speed is low, or when it has a trajectory 2 pointed towards the ground 6, when its nose is pointed towards the ground 6, and when the vertical acceleration vector $d\vec{v}.sol/dt$ is pointed towards the ground 6. In this FIG. 1, it is thus seen that the trajectory. 2 is ascending, which is favorable for this maneuverability margin M, and that this trajectory 2 is rounded upwards, which gives a vertical acceleration vector dvv.sol/dt directed upwards and thus favorable to this maneuverability margin M; similarly, the incidence angle α is positive, which is favorable to it. The influence of these various quantities can then be taken into account in order to supply an insufficient maneuverability signal IM indicating to the pilot that the maneuverability margin M is below a certain insufficient maneuverability threshold SIM. Moreover, this insufficient maneuverability signal IM may also contain an item of information making it possible to know the amplitude of the deviation with respect to said insufficient maneuverability threshold SIM or to any other known value. Hence the pilot is no longer constrained to cyclically check the speed of the aircraft 1, and he is warned when passing below said insufficient maneuverability threshold SIM. Description of the preferred embodiments The block diagram of FIG. 2 shows the arrangement of the circuits making it possible to implement the various steps of the method in order to determine the insufficient maneuverability threshold IM of such an aircraft 1. Hence:

in a preparatory phase, with the aid of a plurality of N simulated, calculated or real flight configurations of the aircraft, a) linear relationships between a first quantity G1, a second quantity G2 and a third quantity G3 are determined, relative respectively to the vertical acceleration dvv.sol/dt of said aircraft 1, to the slope angle γsol of the trajectory 2 of said aircraft 1 with respect to the horizontal, and to the risk of stalling said aircraft 1, by weighting, relatively to each other, the respective instantaneous values $G1i$, $G2i$ and $G3i$, (i: integer = 1, ..., j, k ..., N) of these three quantities by respective coefficients A, B and C which are such that, when the maneuverability margin is estimated to be insufficient for the $G1j$, $G2j$ and $G3j$ values in question of said three quantities, the weighted sum $Dj = A.G1j + B.G2j + C.G3j$ is less than every other weighted sum $Dk = A.G1k + B.G2k + C.G3k$ for which the maneuverability margin is estimated to be sufficient for values $G1k$, $G2k$ and $G3k$ of said quantities G1, G2, G3. It should be noted that one of the coefficients A, B, C may be taken equal to 1, which avoids having to effect the corresponding multiplication, since the weighting between said three quantities is relative, and since it thus suffices to weight two of said quantities absolutely with respect to the nonweighted third quantity, without this restricting the general nature of the present description;

b) a value DO of insufficient maneuverability threshold SIM is chosen, greater than every value of a weighted sum Dj for which the maneuverability margin is insufficient, and less than every value Dk for which the maneuverability margin is sufficient.

In order to do this, the device for implementing said method comprises a first indicator 3, such as an accelerometer, supplying said first quantity G1, a second indicator 4, such as a gyroscope, supplying said second quantity G2, and a third indicator 5, such as a speed indicator for the aircraft 1, with respect to the ground 6, or an incidence angle α indicator, supplying said third quantity G3 relating to the risk of stalling said aircraft 1.

Moreover, an operator 7 supplies, to a data memory 8, a maneuverability information item, and this data memory stores the various values of said quantities and transmits these values to a computer 9 supplying, to a utilization memory 10, the weighting coefficients A, B and C for, respectively, said first, second and third quantities G1, G2 and G3 as well as the value DO of the insufficient maneuverability threshold SIM.

Then, in an in-flight utilization phase, the following steps are carried out:

c) the instantaneous values of said first G1, second G2 and third G3 quantities are simultaneously measured and the sum of said first G1, second G2 and third G3 quantities are calculated, weighted respectively by the weighting coefficients A, B and C. This is achieved by using:

a first multiplier 11, receiving, from said first indicator 3, said first quantity G1, a second multiplier 12 receiving, from said second indicator 4, said second quantity G2, and a third multiplier 13, receiving, from said third indicator 5, said third quantity G3, and multiplying respectively said first, second and third quantities G1, G2 and G3 by the first, second and third coefficient A, B and C, coming from said utilization memory 10, and supplying, respectively, a first, second and third result, said first multiplier 11, second multiplier 12 and third multiplier 13 each being constituted by an operational amplifier or by a digital multiplier;

an algebraic adder 14, receiving respectively, on a first, second and third input, said first, second and third results, and supplying a weighted sum of the values applied on said first, second and third inputs, said adder 14 being constituted by operational amplifiers or by one or more digital adders.

In the following step:

d) said sum is compared to said value DO of insufficient maneuverability threshold SIM and an insufficient maneuverability signal IM is generated if said sum is less than said value DO of insufficient maneuverability threshold SIM. This is achieved by using:

a comparator 15 receiving, on a first input, said sum, and, on a second input, the value DO of insufficient maneuverability threshold SIM, coming from said utilization memory 10, and supplying, at its output, an insufficient maneuverability signal IM if said sum differs from said value DO of insufficient maneuverability threshold SIM, in a sense such that, when the speed of said aircraft 1 with respect to the ground 6 decreases, the value of said sum diverges from the value DO of insufficient maneuverability threshold SIM, said comparator 15 being constituted by an operational amplifier or by a digital comparator.

In this way, a very simple linear relationship is determined between said three quantities, which next permits, by means of an easy and rapid calculation, determination of whether the aircraft 1 has a sufficient maneuverability margin M.

The insufficient maneuverability signal IM is transmitted to the pilot of the aircraft 1, so that he reestablishes a flight configuration such that said insufficient maneuverability signal IM disappears. In order to facilitate control, it is then possible to supply to the pilot a supplementary information item, in the form of a value indicating the deviation between the instantaneous value of the insufficient maneuverability signal IM and said value DO of insufficient maneuverability threshold SIM. The pilot thus has a feedback item indicating to him the effectiveness of a maneuver which he has just initiated in order to reestablish normal flight conditions, that is to say to make the insufficient maneuverability disappear.

Furthermore, the item of information supplied by said insufficient maneuverability signal IM may be transmitted to a flight control device 16, so that it reacts in place of the pilot, the latter remaining in charge, needless to say, of passing back to manual control. This flight control device 16 may also receive said quantities G1, G2 and G3 serving to derive the insufficient maneuverability signal IM, or, at the very least, knows the effect of the commands which it issues on the direction of variation of said quantities. Therefore, receiving the insufficient maneuverability signal IM, it can act on the commands which it issues in order to cause the values of said quantities to vary in a sense tending to cancel out the insufficient maneuverability. This constitutes a threshold-slaved system. The action of said flight control device 16 may bear on only a limited number of said quantities, for example those whose value exceeds a predetermined limit particular to each value, or may bear on all of said quantities if said insufficient maneuverability threshold SIM is clearly exceeded in an unfavorable direction.

This flight control device may also receive several such insufficient maneuverability signals IM, each originating from a comparison with a different insufficient maneuverability threshold SIM from that of the others, or, more simply, receive an insufficient maneuverability signal IM corresponding to a nil value DO of insufficient maneuverability threshold SIM. In this latter case, the value of this insufficient maneuverability signal IM may be chosen as being equal to the value of said sum, and of the same sign. Thus, even when the maneuverability margin M is sufficient, the amplitude of this value of insufficient maneuverability signal IM may serve, for the flight control device, for the sending of commands tending to maximize the amplitude of said insufficient maneuverability signal IM, that is to say to optimize, from this point of view, the flight conditions, said commands acting only in a range of variation of the various said quantities which is compatible with the set values displayed by the pilot, to the extent that a sufficient maneuverability margin M is preserved.

Moreover, it is possible to refine the significance of the insufficient maneuverability signal IM by using more than three quantities, from among the four quantities quoted or others chosen advisedly.

Figure 3:
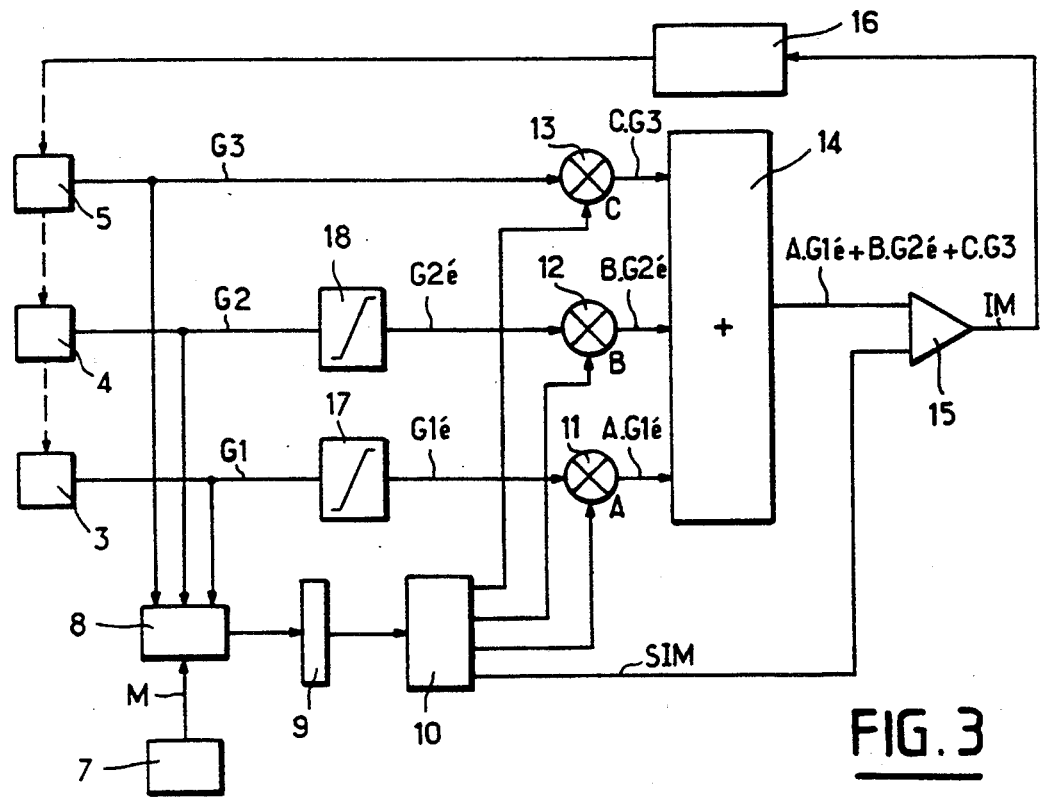
FIG. 3 is a diagrammatic representation of the circuits making it possible to implement a first variant of the processing effected with respect to FIG. 2.

According to a first variant, represented in FIG. 3, in order to avoid one of said quantities supplying too favorable an indication to said insufficient maneuverability signal IM, which would mask a critical insufficiency supplied by at least one of the other two quantities, or which would correspond to flight conditions deviating too far from the normal, the value taken into account for some of these quantities is limited to a range of variation which is smaller than that of the signal coming from the corresponding indicator. Similarly, the range of variation of the values of quantities taken into account, and giving too unfavorable an indication for the insufficient maneuverability signal IM may be limited, in such a way that, in such a case, the other quantities can still influence the value of said insufficient maneuverability signal IM, and inform the pilot of a favorable or unfavorable trend in the value of the insufficient maneuverability signal IM, when this insufficient maneuverability signal IM contains an information item relating to the deviation between its instantaneous value and a reference value. The possible choice of a peak clipping on one side or the other of the range of variation, as explained above, is carried out for each quantity.

In order to do this, the value of the first quantity G1, which is the value of the vertical acceleration $d\bar{v}v.sol/dt$ of the aircraft 1, may undergo peak clipping, limiting the range of variation of this vertical acceleration when the latter is greater than the value of a predetermined high threshold of the vertical acceleration, the high threshold which may have a positive or negative sign. Thus, the vertical accelerations corresponding to a trajectory 2 of the aircraft 1 with a curvature which is turned upwards, thus having a favorable effect on the maneuverability margin M, may not be completely taken into account, but limited to said high threshold value of the vertical acceleration. Conversely, a vertical acceleration corresponding to a trajectory 2 with a curvature turned downwards has an unfavorable effect on this maneuverability margin M, and may not be taken into account until a certain predetermined low threshold value of the vertical acceleration.

Similarly, the second quantity G2, which is the slope angle $\gamma$sol of the trajectory 2 of the aircraft 1 with respect to the horizontal, may, according to the same principle, be taken into account only in a limited range of its variation. The maneuverability margin M is all the greater as this slope angle $\gamma$sol is high, that is to say that the trajectory 2 is ascending with, however, an upper limit. It is then possible to no longer take into account variations in this slope angle $\gamma$sol of the trajectory 2 with respect to the horizontal when it exceeds a certain predetermined upper threshold of slope angle $\gamma$sol of the trajectory 2. Similarly, it is possible not to take into account its variations when it falls below a certain low threshold of the slope angle $\gamma$sol of the trajectory 2 as, then, the value of the insufficient maneuverability signal IM would reach the end stops of the dynamic range provided for this signal and would mask the influences of the variations of the other quantities.

The third quantity G3, which is the speed of the aircraft 1 with respect to the ground 6, or the incidence angle $\alpha$ of the aircraft 1, may, in the same way, and for the same reasons, be taken into account along a limited range of one or of both sides of its range of variation. In the example given, which is not limiting, this limitation is not applied.

In order to produce these peak clippings, the circuits represented in FIG. 3 are used, which have the same function as those of the same reference represented in FIG. 2, as well as additional circuits making it possible to implement said first variant, according to which some of said first, second and third quantities G1, G2 and G3 are peak-clipped on one side or on both sides of their range of variation. In this example, which is not limiting, the peak clipping is carried out on said first quantity G1 and second quantity G2 only. In order to do this, said first and second quantities G1 and G2, respectively coming from said first indicator 3 and second indicator 4, are respectively applied to a first peak clipper 17 and to a second peak clipper 18 which limit the variation of the value of said quantities, on one side or the other, or on both, these limits being previously defined and stored in memory in analog form in the peak clipper itself or in digital form in the utilization memory 10. The respective outputs of said first peak clipper 17 and second peak clipper 18 supply a peak-clip value G1é of the first quantity G1 and a peak-clipped value G2é of the second quantity G2 and are applied, respectively, unlike what is represented in FIG. 2, on said first multiplier 11 and second multiplier 12, in lieu and in place of said first quantity G1 and second quantity G2.

These peak clippers may be analog circuits, such as an assembly comprising one or two diodes, or digital circuits.

This first peak clipping and this second peak clipping are independent of one another, as explained above, that is to say that one or the other may be absent or even peak clip on only one side while the other peak clips on the opposite side or both sides of the range of variation of the quantity which it receives. Thus a weighted sum $A.G1é+B.G2é+C.G3$ is obtained. This FIG. 3 shows that the peak clipping is carried out on the values of the quantities which serve to calculate said weighted sum; the same peak clipping can be carried out on the values of the quantities serving for initial determination of the weighting coefficients, either by using the values previously peak-clipped, or by carrying out an identical peak clipping, by means of the computer 9, during determination of said weighting coefficients.

The fact of limiting the dynamic range of variation of said quantities taken into account makes it possible to avoid a quantity making the value of the insufficient maneuverability signal reach its end stop, which would mask, from the pilot, the effect of the variations of the other two quantities on the variation of said insufficient maneuverability signal IM, and hence would not permit him to obtain feedback during his manoeuver to reestablish normal flight conditions. This can, in fact, be particularly important, especially in such a situation in which the value of one of said quantities is extreme, which may signify a particularly awkward flight configuration.

Figure 4:
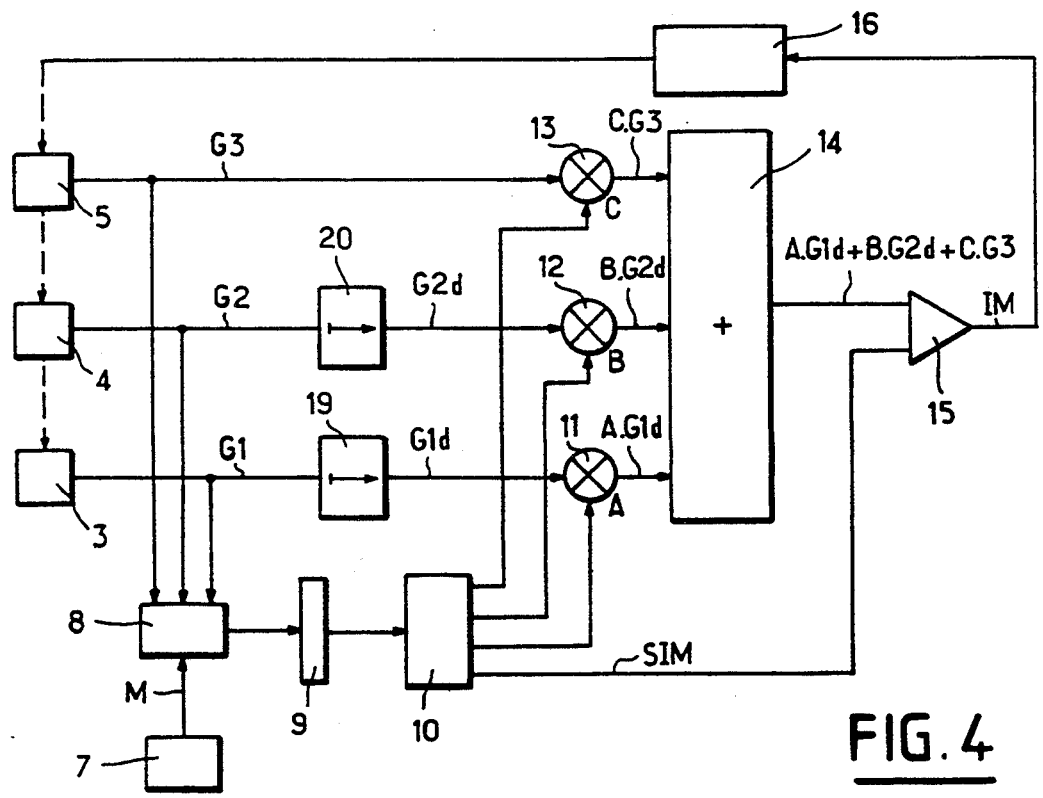
FIG. 4 is a diagrammatic representation of circuits making it possible to implement a second variant of the processing effected with respect to FIG. 2.

In FIG. 4 are represented the circuits making it possible to produce a second variant of the processing carried out in relation to FIG. 2, this second variant being able to coexist with said first variant set out above. Some of said first quantity G1, second quantity G2 and third quantity G3, coming respectively from the first indicator 3, second indicator 4 and third indicator 5, undergo a zero offset which is particular to them. Thus, in the non-limiting example represented in FIG. 4, only the first quantity G1 and second quantity G2 undergo such an offset of the zero. This has the effect of optimizing the taking into account of the relative influence of each of the three quantities.

This FIG. 4 shows that the offset of the zero is carried out on the values of the quantities which serve to calculate said weighted sum; the same offset of the zero may also be carried out on the values of the quantities serving for the initial determination of the weighting coefficients, either by using the previously defined values with offset zero, or by carrying out an identical offset in the computer 9, during determination of said weighting coefficients.

In order to implement this second variant, the same circuits are used as shown in FIG. 4 which have the same functions as the circuits of the same reference of FIG. 2, as well as the additional circuits specific for said second variant. A first offset circuit 19 and a second offset circuit 20 receive the values of said first quantity G1 and second quantity G2 and supply respectively a first offset quantity $G1d$ and a second offset quantity $G2d$ which are respectively applied to the first multiplier 11 and to the second multiplier 12, which permits implementation of said second variant. These first offset circuit 19 and second offset circuit 20 are constituted by an analog assembly adding a polarizing voltage to the value of the quantity presented in the form of an analog voltage, or are constituted by an algebraic digital adder, offsetting, by the required value, the value of the quantity in question. In this latter case, the offset value may be stored in the utilization memory 10.

In the case where a peak clipping is also carried out, as set out above, this peak clipping is carried out before or after offsetting of the zero, and the values of the peak-clipping thresholds are possibly offset in order to take account of this offsetting. It is quite clear that, for these two variants, the peak clipping or the offsetting of the zero may be carried out after weighting of the quantity in question, by consequently correcting the values of the thresholds of peak clipping and offsetting of the zero. Thus a weighted sum $A.G1d+B.G2d+C.G3$ is obtained.

I claim:

1. A method for signalling insufficient maneuverability of an aircraft, wherein:

in a preparatory phase, with the aid of a plurality of N simulated, calculated or real flight configurations of the aircraft, a) linear relationships between a first, a second and a third quantity (G1, G2 and G3) are determined, relative respectively to the vertical acceleration of said aircraft, to the slope angle of the trajectory of said aircraft with respect to the horizontal, and to the risk of stalling said aircraft, by weighting, relatively to each other, the respective instantaneous values $G1i$, $G2i$ and $G3i$, with $(i=1,2,\ldots,j,k,\ldots,N)$ of these three quantities by respective coefficients A, B and C which are such that, when the maneuverability margin is estimated no be insufficient for the $G1j$, $G2j$ and $G3j$ values in question of said three quantities, the weighted sum $Dj=A.G1j+B.G2j+C.G3j$ is less than every other weighted sum $Dk=A.G1k+B.G2k+C.G3k$ for which the maneuverability margin is estimated to be sufficient for values $G1k$, $G2k$ and $G3k$ of said quantities G1, G2 and G3;

b) a value DO of insufficient maneuverability threshold (SIM) is chosen, greater than every value Dj of a weighted sum for which the maneuverability margin is insufficient, and less than every value Dk for which the maneuverability margin is sufficient;

then, in an in-flight utilization phase:

c) the instantaneous values of said first, second and third quantities (G1, G2, G3) are simultaneously measured and the sum of said first, second and third quantities (G1, G2, G3) are calculated, weighted respectively by the weighting coefficients A, B and C; and d) said sum is compared to said value DO of insufficient maneuverability threshold (SIM) and an insufficient maneuverability signal (IM) is generated if said sum is less than said value DO of insufficient maneuverability threshold (SIM).

2. The method as claimed in claim 1, wherein said third quantity (G3) represents the speed of the aircraft with respect to the ground.

3. The method as claimed in claim 1, wherein said third quantity (G3) represents the incidence angle ($\alpha$) of the aircraft.

4. The method as claimed in claim 1, wherein one of said weighting coefficients (A, B, C) is equal to 1.

5. The method as claimed in claim 1, wherein the zero of some of said first, second and third quantities (G1, G2, G3) is offset.

6. The method as claimed in claim 1, wherein the peaks of some of said first, second and third quantities (G1, G2, G3) are clipped on at least one side of their range of variation.

7. The method as claimed in claim 1, wherein said insufficient maneuverability signal (IM) contains an item of information indicating the amplitude of said insufficient maneuverability.

8. The method as claimed in claim 1, wherein said insufficient maneuverability signal is representative of the quantified maneuverability margin or is an "all-or-nothing" signal indicating insufficient maneuverability.

9. The method of signalling insufficient maneuverability of an aircraft as claimed in claim 1, wherein said insufficient maneuverability signal (IM) is supplied to a flight control device of said aircraft.

10. The method of signalling insufficient maneuverability of an aircraft as claimed in claim 9, wherein said flight control device acts essentially on those of said quantities (G1, G2, G3) whose value clearly deviates from a particular predetermined limit value.

11. The method of signalling insufficient maneuverability of an aircraft as claimed in claim 9, wherein said flight control device acts on said quantities (G1, G2, G3) in order to optimize the maneuverability margin.

12. A device for signalling insufficient maneuverability of an aircraft, comprising a first indicator able to supply a first quantity (G1) relating to the vertical acceleration of said aircraft, a second indicator able to supply a second quantity (G2) relating to the slope angle of the trajectory of said aircraft with respect to the horizontal, and a third indicator able to supply a third quantity (G3) relating to the risk of stalling said aircraft, which comprises:

a first, a second and a third multiplier, receiving respectively said first, second and third quantities (G1, G2, G3), able to multiply respectively said quantity received by a first, a second and a third predetermined coefficient, and able to supply, respectively, a first, a second and a third result;

an algebraic adder, receiving respectively, on three inputs, said first, second and third results and able to supply a sum corresponding to the summing of the values applied at said three inputs;

a comparator receiving, on a first input, said sum, and, on a second input, a predetermined value (DO) of insufficient maneuverability threshold (SIM), and able to supply, at its output, an insufficient maneuverability signal (IM) if said sum differs from said predetermined value (DO) of insufficient maneuverability threshold (SIM), in a sense such that, when the speed of said aircraft with respect to the ground decreases, the value of said sum diverges from said value (DO) of insufficient maneuverability threshold (SIM).

13. A device for signalling insufficient maneuverability of an aircraft comprising a first indicator able to supply a first quantity (G1) relating to the vertical acceleration of said aircraft, a second indicator able to supply a second quantity (G2) relating to the slope angle of the trajectory of said aircraft with respect to the horizontal, and a third indicator able to supply a third quantity (G3) relating to the risk of stalling said aircraft, which comprises:

a first and a second multipliers, respectively receiving one among said first, second and third quantities (G1, G2, G3), able to multiply respectively said quantity received by a first and a second predetermined coefficient, and able to supply, respectively, a first result and a second result;

an algebraic adder, receiving respectively, on three inputs, said first and second results and that one, among said first, second and third quantities (G1, G2, G3) that said first and second multipliers do not receive, and able to supply a sum corresponding to the summing of the values applied at said inputs;

a comparator receiving, on a first input, said sum, and, on a second input, a predetermined value (DO) of insufficient maneuverability threshold (SIM), and able to supply, at its output, an insufficient maneuverability signal (IM) if said sum differs from said predetermined value (DO) of insufficient maneuverability threshold (SIM), in a sense such that, when the speed of said aircraft with respect to the ground decreases, the value of said sum diverges from said value (DO) of insufficient maneuverability threshold (SIM).

14. The device for signalling insufficient maneuverability of an aircraft as claimed in claim 12, which comprises at least one peak clipper able to limit the range of variation of one of said first, second or third quantities (G1, G2, G3).

15. The device for signalling insufficient maneuverability of an aircraft as claimed in claim 12, which comprises at least one offset circuit able to offset the reference of the zero of one of said first, second or third quantities (G1, G2, G3).

* * * * *

UNITED STATES PATENT AND TRADEMARK OFFICE
CERTIFICATE OF CORRECTION

PATENT NO. : 5,367,460

DATED : November 22, 1994

INVENTOR(S) : PIERRE FABRE

It is certified that error appears in the above-identified patent and that said Letters Patent is hereby corrected as shown below:

On the title page,
   item [73], "Societe Nationale Industrielle et Aerospatiale" should be --Aerospatiale Societe Nationale Industrielle--.

Column 3, line 30, "sumcorresponding" should be --sum corresponding--.

Column 3, line 63, "Gi" should be --G1--.

Column 4, line 26, "slim" should be --sum--.

Column 4, line 56, "aircraft l" should be --aircraft 1--.

Column 5, lines 16 and 17, "Description of the preferred embodiment" should be a heading.

Column 10, line 40, "no" should be --to--.

Signed and Sealed this

Tenth Day of January, 1995

Attest:

BRUCE LEHMAN

Attesting Officer

Commissioner of Patents and Trademarks